(12) United States Patent  
Fryzek et al.

(10) Patent No.: US 8,079,556 B2  
(45) Date of Patent: Dec. 20, 2011

(54) LIGHTING FIXTURE MOUNTING PLATFORM

(76) Inventors: Aaron Fryzek, Wheaton, IL (US);  
Aaron O'Brien, Munster, IN (US)

( * ) Notice: Subject to any disclaimer, the term of this patent is extended or adjusted under 35 U.S.C. 154(b) by 846 days.

(21) Appl. No.: 11/912,733

(22) PCT Filed: Apr. 29, 2005

(86) PCT No.: PCT/US2005/014861  
§ 371 (c)(1), (2), (4) Date: Jun. 25, 2008

(87) PCT Pub. No.: WO2006/118565  
PCT Pub. Date: Nov. 9, 2006

(65) Prior Publication Data  
US 2008/0259614 A1    Oct. 23, 2008

(51) Int. Cl.  
*A47H 1/00* (2006.01)  
*F21V 15/00* (2006.01)

(52) U.S. Cl. .............. 248/205.1; 248/200.1; 248/343; 362/147; 362/365; 362/368

(58) Field of Classification Search .............. 362/264, 362/365, 357, 382, 147, 364, 368, 370, 306, 362/150; 174/55, 58; 248/200.1, 205.1, 248/317, 342, 343, 344, 906  
See application file for complete search history.

(56) References Cited

U.S. PATENT DOCUMENTS

| | | | | |
|---|---|---|---|---|
| 4,327,403 A * | 4/1982 | Capostagno et al. | .......... | 362/306 |
| 4,408,262 A * | 10/1983 | Kusmer | .......... | 362/147 |
| 4,439,643 A * | 3/1984 | Schweizer | .......... | 381/395 |
| 4,803,603 A * | 2/1989 | Carson | .......... | 362/150 |
| 4,967,990 A * | 11/1990 | Rinderer | .......... | 248/205.1 |
| 6,209,836 B1 * | 4/2001 | Swanson | .......... | 248/906 |
| 7,118,254 B2 * | 10/2006 | Czech | .......... | 362/365 |
| 7,472,875 B2 * | 1/2009 | Rinderer | .......... | 248/200.1 |
| 2004/0085775 A1 * | 5/2004 | Bucher et al. | .......... | 362/404 |
| 2005/0072891 A1 | 4/2005 | Wright | | |

OTHER PUBLICATIONS

International Search Report corresponding to PCT/US2005/14861 dated Dec. 28, 2005.  
International Search Report for PCT/US05/14861 mailed Dec. 28, 2005 (1 page).

* cited by examiner

*Primary Examiner* — Tan Le

(57) ABSTRACT

A mounting platform for a lighting fixture comprising a substantially flat plate and an integral cutting guide. The integral cutting guide includes an aperture formed through the substantially flat plate and a flange formed around a perimeter of the aperture. The flange and the substantially flat plate intersect in a curve. The flange can form an angle of less than 90 degrees with respect to the bottom surface. The mounting platform can also include elongated slots for securing the mounting platform to a ceiling support member. The elongated slots are of a sufficient length to allow the mounting platform to be secured to the ceiling support member to allow placement of the integral cutting guide between a first ceiling support member and a second ceiling support member. The span between the first and second ceiling support members can be in the range of approximately 16 to 24 inches.

14 Claims, 2 Drawing Sheets

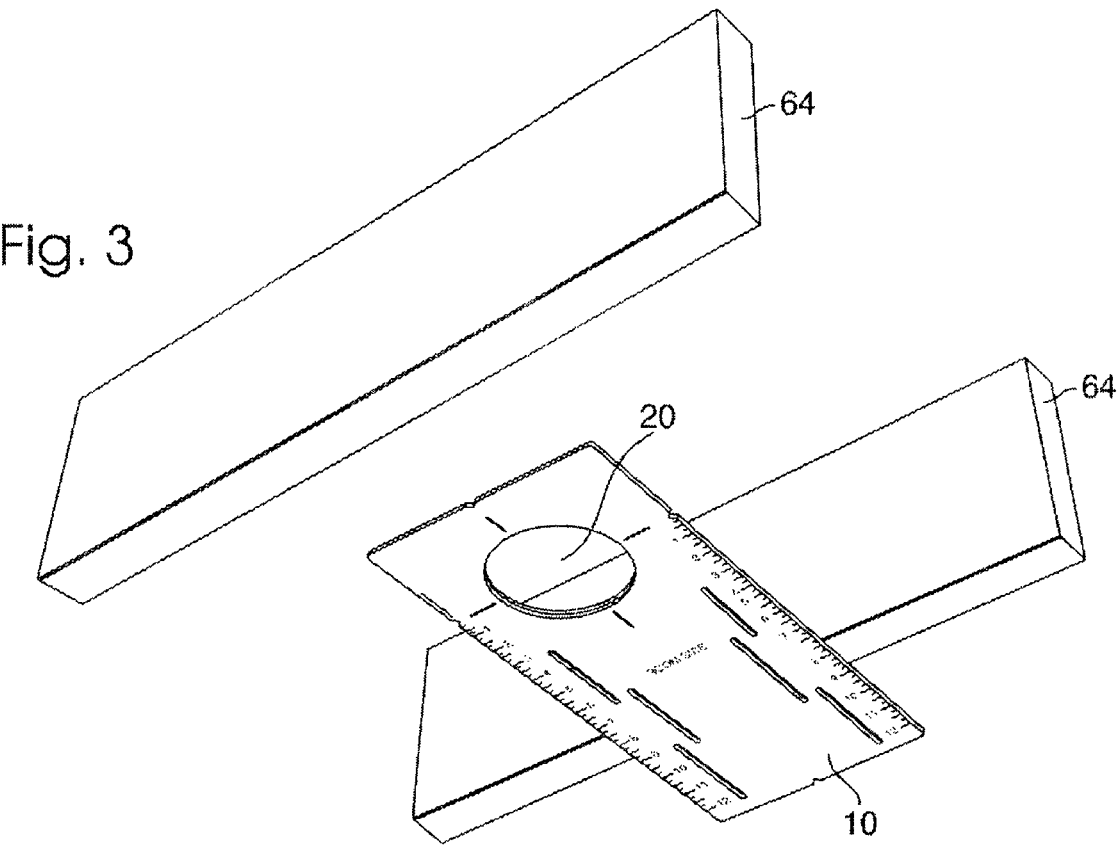

LIGHTING FIXTURE MOUNTING PLATFORM

FIELD OF THE INVENTION

The present invention relates generally to lighting fixtures and in particular to installation of downlights.

BACKGROUND ART

Lighting fixtures, such as recessed or semi-recessed lights, are commonly installed with the assistance of mounting bars. In a new construction setting (i.e. where the ceiling is in a "rough state" allowing for easy access to install electrical, mechanical, plumbing elements, etc.), the lighting fixtures can be installed between the ceiling support members, such as rafters, joist or other similar structures, prior to installing the ceiling. This allows for accurate placement of the light fixtures, but not necessarily accurately cut finish holes. This method is also undesirable because it requires the contractor to purchase and install lighting fixtures well ahead of the intended finish date for the structure.

Recessed lighting fixtures may also be installed after a ceiling structure is completed, reducing the time between the contractor's purchases and the completion of the project. This method typically involves using a lighting fixture that has a mounting structure integral to the light fixture, which eliminates the need for using mounting bars. Installation of this type of recessed fixtures requires a specific size hole, directly related to the diameter of the fixture, to be cut through the ceiling material. The fixture is then inserted into the hole and secured to the ceiling material using the provided integral mounting structure.

Typically, a template, guide or measuring device is required to outline the correct size hole required for the lighting fixture. This requires additional labor and effort to conduct precise measurements to locate and cut an accurately sized hole. When installing the fixtures according to the predetermined lighting layout, the placement of the fixtures is also entirely dependent on the various measurements of the installer after installation of the ceiling. Therefore, accurate placement of the fixtures is not always achieved, and obstructions behind the ceiling may prevent installation of the light fixture in a desired location.

Another method for installing a recessed lighting fixture is through the use of a mounting plate. As with new construction installations, the mounting plate is installed prior to the installation of the ceiling material. The plate does not use bar hangers for the method of attachment, but is fastened directly to the narrow flat edge of a ceiling support member that is parallel to the floor. The ceiling is then installed covering the mounting plate. After the ceiling material is completed, the contractor locates the mounting plates and cuts holes in the ceiling using the installed mounting plate as the guide for locating and cutting his hole. The wiring is then completed and recessed lighting fixture is inserted into the hole and secured into place. This method reduces the time between the contractor's purchases and the completion of the project, but without many of the drawbacks of conventional remodeling installations.

However, conventional mounting plates include numerous drawbacks. For example, conventional mounting plates are not designed to simultaneously address various construction styles. For example, the same mounting plate cannot be used with ceiling support members that are 16" apart and with ceiling support members that are 24" apart. Furthermore, in conventional mounting plate designs, the outside vertical surface of the cylindrical return is required to be used as the cutting guide, causing the plate to be pushed back away from the rear side of the ceiling material when covered by the ceiling material. Accordingly, the plate may not be in the correct position during installation, increasing the possibility of cutting a hole that is oversized, out of round, or both.

Accordingly, it is desirable to have one mounting platform that addresses all construction styles, allows for a more accurate layout, and reduces the potential for making oversized holes that would cause final installation problems with both the remodel type recessed lighting fixture and the finish trim.

SUMMARY OF THE INVENTION

The present invention is a mounting platform for a lighting fixture comprising a substantially flat plate and an integral cutting guide. The integral cutting guide includes an aperture formed through the substantially flat plate and a flange formed around a perimeter of the aperture. In one embodiment, the flange and the substantially flat plate intersect in a curve and the flange forms an angle of less than 90 degrees, and preferably approximately 30 degrees, with respect to the bottom surface.

The mounting platform may also include elongated slots for securing the mounting platform to a ceiling support member. In one embodiment, the platform may include a first elongated slot positioned proximal to the left edge of the mounting platform and a second elongated slot positioned proximal to the right edge of the mounting platform. The elongated slots are preferably of a sufficient length to allow the mounting platform to be secured to the ceiling support member to allow placement of the integral cutting guide between the ceiling support member and a second ceiling support member wherein the span between the ceiling support member and the second ceiling support member is up to about 24 inches.

At least one slit may also be positioned proximal to the perimeter of the integral cutting guide and extending in a radial direction from a center of the integral cutting guide. In one embodiment, the mounting platform includes a first slit located proximal to a portion of the integral cutting guide closest to a top edge of the mounting platform, a second slit located proximal to a portion of the integral cutting guide closest to a bottom edge of the mounting platform, a third slit located proximal to a portion of the integral cutting guide closest to a right edge of the mounting platform, and a fourth slit located proximal to a portion of the integral cutting guide closest to a left edge of the mounting platform.

The mounting platform may also include a first notch in a top edge of the mounting platform, a second notch in a bottom edge of the mounting platform, a third notch in a right edge of the mounting platform, a fourth notch in a left edge of the mounting platform. In one aspect, the first and second notches are in line with a center of the integral cutting guide along a longitudinal axis of the mounting platform, and the third and fourth notches are in line with a center of the integral cutting guide along a lateral axis of the mounting platform.

In another aspect, the present invention may also include a method for forming a mounting platform for a lighting fixture from a substantially flat plate having an upper surface and a bottom surface. The method includes forming an aperture in the substantially flat plate, and bending a portion of the plate at the perimeter of the aperture more than 90 degrees with respect to the bottom surface to form a flange, wherein the flange and the substantially flat plate intersect in a curve. The method may also include forming at least a first elongated slot proximal to the right edge of the mounting platform and forming at least a second elongated slot proximal to the right edge of the mounting platform, where each of the at least one first and second elongated slots are of a sufficient length to allow the mounting platform to be secured to a ceiling support member and to allow placement of the integral cutting guide between the ceiling support member and a second ceiling support member wherein the span between the ceiling support member and the second ceiling support member up to about 24 inches.

BRIEF DESCRIPTION OF THE DRAWINGS

FIG. 3 shows one embodiment of a mounting platform installed on a ceiling support member according to the present invention.

DETAILED DESCRIPTION

Figure 1:
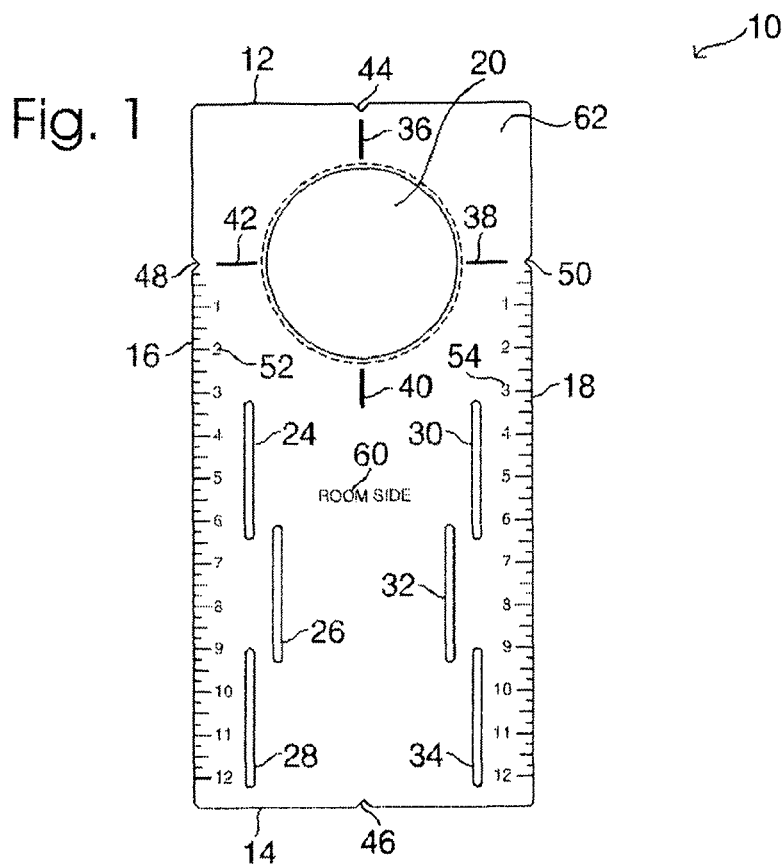
FIG. 1 shows one embodiment of a mounting platform according to the present invention.

The present invention is a mounting platform 10 for use in the installation of lighting fixtures that serves both as a location mark for electrical rough-in and as a hole locator for drywall installation. As shown in FIG. 1, the mounting platform is preferably rectangular. For purposes of description in this patent, the fours edges of the mounting platform in this embodiment are referred to herein as a top edge 12, a bottom edge 14, a left edge 16, and a right edge 18. In one embodiment, the mounting platform 10 has a length of 16.5 inches and a width of 8 inches. The mounting platform 10 is also preferably constructed from a single plate of sheet metal. It should be understood, however, that the mounting platform may alternatively be formed in other shapes, have different lengths of widths, and constructed using other materials without departing from the present invention.

The mounting platform 10 includes an integral cutting guide 20. In one embodiment, the cutting guide 20 is an aperture in the mounting platform. As most recessed lighting fixtures require a circular hole for installation, the aperture is preferably circular in shape and has a diameter that is chosen based on the size of the lighting fixture to be installed. For example, as shown in FIG. 1, the cutting guide may have a diameter of 4.375 inches. Of course, both the size and/or shape of the cutting guide may be changed based on the associated lighting fixture.

Figure 2:
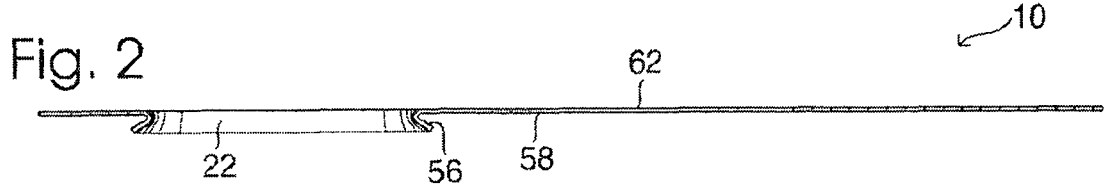
FIGS. 2 and 2A show a cross section of one embodiment of the mounting platform in FIG. 1.
Figure 2A:
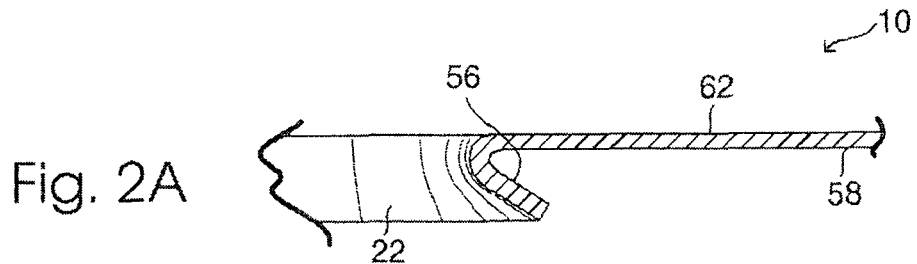

As shown in FIGS. 2 and 2A, the interior edge of the integral cutting guide 20 is formed as a smooth rolled edge 22 arranged to face opposite the drywall or other ceiling material (after platform installation), thereby allowing the platform 10 to sit flush against the rear side (i.e., the side facing into the plenum) of the ceiling material. In one embodiment shown in FIG. 2A, the smooth rolled edge 22 is preferably constructed by bending a portion of the interior edge of the integral cutting beyond 90°. Preferably, the bent portion of the interior edge creates a flange 56 that forms approximately a 30° angle between the flange 56 and the bottom surface 58 of the mounting platform. In one embodiment, the distance, in a direction perpendicular to the bottom surface 58, from the end of the flange 56 to the bottom surface 58 is 0.18 inches and the curved edge formed at the intersection between the flange 56 and the bottom surface 56 preferably has a radius of curvature of approximately 0.03 inches. As a result, the integral cutting guide 20 helps to avoid inaccurate hole cutting when using the mounting platform.

The mounting platform 10 also includes means for securing the mounting platform to a ceiling support member (or joist). Essentially, the securing means is one or more guides used in combination with one or more mechanical fasteners to properly locate the platform 10 relative to a ceiling support member. The securing means is preferably positioned to address various distances between ceiling support members. For example, in one embodiment, the securing means may be positioned to accommodate spans between ceiling support members up to 24 inches apart. As a result, there are no "dead spots" that could undesirably complicate the installation of a recessed lighting fixture in any typical application.

Referring back to FIG. 1, the securing means may include three elongated slots 24, 26, and 28 positioned proximal to the left side of the mounting platform 10 and three elongated slots 30, 32, and 34 positioned proximal to the right side of the mounting platform. The elongated slots 24, 26, 28, 30, 32, and 34 are each shaped so as to allow a fastener, such as a nail or screw, to be inserted through the slot and into a ceiling support member, thereby securing the platform 10 against the ceiling support member. In one embodiment, each of the elongated slots may each be 3.25 inches in length along longitudinal axis A and approximately 0.20 inches in width. The center elongated slots 26 and 32 on each side may be positioned closer to the interior of the mounting platform than slots 24, 28, 30, and 34, allowing a portion of the center slots 26 and 32 to overlap with the other slots. In one embodiment, elongated slots 24, 28, 30, and 34 are formed 1.375 inches from the edge while elongated slots 26 and 32 are formed 2 inches from the edge.

Although the securing means are depicted as elongated slots proximal to the sides of the platform 10 to properly locate the platform relative to the ceiling support members, the number of slots and the shape of the slots may be changed as long as the mounting platform provides a way for a user to secure the platform to various widths of ceiling support members. For example, the mounting platform may include only a single elongated slot proximal to each of the left and right edges or more than three elongated slots. Alternatively, the mounting platform may also include numerous holes, rather than slots, positioned at various locations along each side of the mounting platform. In another alternative, the securing means may include markings on the platform rather than apertures to indicate desired placement for the one or more fasteners. These markings may also be simple ink markings or dimples embossed in the platform or a combination thereof.

In order to simplify installation, the mounting platform 10 may also include four slits 36, 38, 40, and 42 located near the cutting guide 20. The four slits are preferably located at 0°, 90°, 180°, & 270° (where 0° is defined as the portion of the cutting guide closest to the top edge of the mounting platform) around the cutting guide. Each slit preferably begins just outside the radius of the cutting guide and extends radially away from the center of the cutting guide.

Each slit 36, 38, 40, and 42 is preferably shaped so as to provide retention of the end of a typical tape measure. In one embodiment, each slit may be 0.825 inches in length and 0.04 inches in width. Accordingly, the four slits 36, 38, 40 and 42 allow for an accurate center-to-center measurement between various mounting platforms to be obtained without an additional person holding the tape measure in place.

As shown in FIG. 1, the mounting platform 10 may also include four notches 44, 46, 48, and 50, each positioned along one of the four sides of the mounting platform 12, 14, 16, and 18, respectively. The notches 44, 46, 48, and 50 are preferably triangular in shape, with the center of each of the notch being aligned with the center of the integral cutting guide 20. In one embodiment, each triangular notch is approximately 0.376 inches in width and extends approximately 0.188 inches in depth from the edge of the mounting platform. During installation, the notches may be used to keep multiple mounting platforms in-line with each other by using a string, chalk line, laser or other similar measuring devices for alignment. Although the notches are shown as being triangular, they may be also be of any other shape that provide aid in alignment.

As shown in FIG. 1, the mounting platform also preferably includes integral measurement guides 52 and 54 along the left and right sides of the mounting platform. As shown in FIG. 1, the integral measurements are preferably in inches. However, the integral measurements may alternatively be in metric denominations or any other unit of measurement, or any combination of different units of measurement. These measurements may be stamped into the platform or printed on the surface of the platform or applied by appliance.

In the embodiment shown in FIG. 1, the integral measurement guides 52 and 54 indicate the distance from the center of the integral cutting guide opening along the longitudinal axis A of the mounting platform 10. The integral measurement guides facilitate consistent placement of the platform with respect to the ceiling support members, without the need for additional measuring tools or measurements. The integral measurement guides may also be used to aid in determining that the platform is positioned 90° from the joist. Of course, it is understood that while the illustrated mounting platform includes two guides, the mounting platform may also include only a single guide.

Finally, the mounting platform 10 may also include markings to identify the face of the mounting platform plate that should be directed toward the room for proper orientation during installation. Such markings help to ensure that the mounting plate is installed with the cutting guide 20 in the proper orientation. As shown in FIG. 1, these markings 60 may simply be comprised of the words "Room Side" printed or on embossed in the upper surface 62 of the mounting platform. The words "Ceiling Side" may then be printed on the bottom surface of the mounting platform. Of course, the markings may be any other type of designation such as symbols or colors.

In use, as shown in FIG. 3, the mounting platform 10 is preferably installed on a ceiling support member 64 prior to the installation of the ceiling material (not shown). To properly orient the platform 10, the integral measurement guides and notches are used as described above to help align and position the mounting platform. Fasteners, such as nails or screws, are used to secure the mounting platform 10 to a ceiling support member 64. Preferably, one fastener is placed in an elongated slot near the right edge of the platform and a second fastener is placed in an elongated slot near the left edge and directly across from the first fastener.

Preferably, once all the mounting platforms for a given ceiling are secured, the ceiling material is installed. Due to the design of the integral cutting guide 20, the mounting platform 10 sits flush with the top side of the ceiling material This allows the integral cutting guide to remain in the proper position, which will allow for an optimized opening during installation of the fixture.

The user then locates the mounting plates and cuts the holes in the ceiling by using the installed mounting plate as the guide for locating and cutting his hole. The smooth shape of the integral cutting edge 20 results in more surface area of the guide in contact with the cutting device, such as a rotary cutting tool. The integral cutting edge 20 is also shaped such that the cutting tool follows the inside of the cutting guide, resulting in a more accurate cut.

After cutting a hole in the ceiling, the wiring is completed and the recessed lighting fixture is inserted into the hole and secured into place. The lamp and finish trim can then be installed completing the installation.

While various embodiments of the application have been described, it will be apparent to those of ordinary skill in the art that many more embodiments and implementations are possible that are within the scope of this invention. Accordingly, the invention is not to be restricted except in light of the attached claims and their equivalent.

The invention claimed is:

1. A mounting platform for a lighting fixture, the mounting platform comprising:
   a substantially flat plate having an upper surface and a bottom surface;
   an integral cutting guide including an aperture formed through the substantially flat plate and a flange formed around a perimeter of the aperture; and
   first, second, third and fourth slits positioned proximal to the perimeter of the integral cutting guide and extending radially from a center of the integral cutting guide,
   wherein the first slit is located proximal to a portion of the integral cutting guide closest to a top edge of the mounting platform,
   wherein the second slit is located proximal to a portion of the integral cutting guide closest to a bottom edge of the mounting platform,
   wherein the third slit is located proximal to a portion of the integral cutting guide closest to a right edge of the mounting platform,
   wherein the fourth slit is located proximal to a portion of the integral cutting guide closest to a left edge of the mounting platform,
   wherein the flange and the substantially flat plate intersect at a curved edge extending between the flange and the substantially flat plate, and
   wherein the flange forms an angle of less than 90 degrees with respect to the bottom surface.

2. The mounting platform of claim 1 wherein the flange forms an angle of approximately 30 degrees with respect to the bottom surface.

3. The mounting platform of claim 1 further comprising means for securing the mounting platform to a ceiling support member.

4. The mounting platform of claim 1 wherein the substantially flat plate additionally has a top edge, a bottom edge, a right edge, and a left edge, the substantially flat plate further including:
   at least a first elongated slot positioned proximal to the left edge of the mounting platform; and
   at least a second elongated slot positioned proximal to the right edge of the mounting platform;
   wherein each of the at least one first and second elongated slots are of a sufficient length to allow the mounting platform to be secured to the ceiling support member to allow placement of the integral cutting guide between the ceiling support member and a second ceiling support member wherein the span between the ceiling support member and the second ceiling support member is up to about 24 inches.

5. The mounting platform of claim 1 wherein the each of the slits is approximately 0.825 inches in length and approximately 0.04 inches in width.

6. The mounting platform of claim 1 further comprising an integral measurement guide on the upper surface.

7. A mounting platform for a lighting fixture, the mounting platform comprising:
   a substantially flat plate having an upper surface and a bottom surface;
   an integral cutting guide including an aperture formed through the substantially flat plate and a flange formed around a perimeter of the aperture; and
   a plurality of notches including a first notch in a top edge of the mounting platform, a second notch in a bottom edge of the mounting platform, a third notch in a right edge of the mounting platform, and a fourth notch in a left edge of the mounting platform;
   wherein the first and second notches are in line with a center of the integral cutting guide along a longitudinal axis of the mounting platform,
   wherein the third and fourth notches are in line with a center of the integral cutting guide along a lateral axis of the mounting platform,
   wherein the flange and the substantially flat plate intersect at a curved edge extending between the flange and the substantially flat plate, and
   wherein the flange forms an angle of less than 90 degrees with respect to the bottom surface.

8. A mounting platform for a lighting fixture, the mounting platform comprising:
   a substantially flat plate having an upper surface and a bottom surface;
   an integral cutting guide including an aperture formed through the substantially flat plate and a flange formed around a perimeter of the aperture; and
   means for securing the mounting platform to a ceiling support member, the securing means being formed so as to allow placement of the integral cutting guide between the ceiling support member and a second ceiling support member wherein the span between the ceiling support member and the second ceiling support member is up to about 24 inches,
   wherein the flange and the substantially flat plate intersect at a curved edge extending between the flange and the substantially flat plate, and
   wherein the flange forms an angle of less than 90 degrees with respect to the bottom surface.

9. The mounting platform of claim 8 wherein the securing means comprises at least one elongated slot positioned proximal to an edge of the mounting platform.

10. A mounting platform for a lighting fixture, the mounting platform comprising:
    a substantially flat plate having an upper surface, a bottom surface, a top edge, a bottom edge, a right edge, a left edge, an aperture extending therethrough, and a flange projecting at an oblique angle from the bottom surface of the substantially flat plate, the flange extending from a perimeter of the aperture and intersecting the substantially flat plate at a curved edge extending from the substantially flat plate to the flange;
    at least a first elongated slot positioned proximal to the left edge of the mounting platform; and
    at least a second elongated slot positioned proximal to the right edge of the mounting platform;
    wherein each of the first and second elongated slots are shaped so as to allow the mounting platform to be secured to ceiling support members having a span of up to about 24 inches between the ceiling support members.

11. The mounting platform of claim 10 wherein the at least first and second elongated slots are positioned along a longitudinal direction of the mounting platform.

12. The mounting platform of claim 11 wherein the first and second elongated slots have a width of approximately 0.2 inches.

13. The mounting platform of claim 12 wherein the at least first and second elongated slots have a length of at least 3.25 inches.

14. A method for forming a mounting platform for a lighting fixture from a substantially flat plate having an upper surface and a bottom surface, the method comprising:
    forming an aperture in the substantially flat plate;
    bending a portion of the plate at the perimeter of the aperture more than 90 degrees with respect to the bottom surface to form a flange such that the flange and the substantially flat plate intersect in a curve, the portion of the plate being bent such that the flange forms a 30 degree angle with respect to the bottom surface; and
    forming at least a first elongated slot proximal to the right edge of the mounting platform and forming at least a second elongated slot proximal to the right edge of the mounting platform, each of the at least one first and second elongated slots being of a sufficient length to allow the mounting platform to be secured to a ceiling support member and to allow placement of the integral cutting guide between the ceiling support member and a second ceiling support member wherein the span between the ceiling support members is up to about 24 inches.

* * * * *